(12) United States Patent
Clements et al.

(10) Patent No.: US 7,833,503 B2
(45) Date of Patent: Nov. 16, 2010

(54) EXHAUST GAS TREATMENT

(75) Inventors: Christopher James Philip Clements, Burnham on Sea (GB); Derek Martin Baker, Keynsham (GB); Andrew James Seeley, Bristol (GB)

(73) Assignee: Edwards Limited, Crawley, West Sussex (GB)

( * ) Notice: Subject to any disclaimer, the term of this patent is extended or adjusted under 35 U.S.C. 154(b) by 1284 days.

(21) Appl. No.: 10/509,398

(22) PCT Filed: Mar. 27, 2003

(86) PCT No.: PCT/GB03/01356

§ 371 (c)(1),
(2), (4) Date: Oct. 3, 2005

(87) PCT Pub. No.: WO03/082444

PCT Pub. Date: Oct. 9, 2003

(65) Prior Publication Data

US 2006/0065120 A1     Mar. 30, 2006

(30) Foreign Application Priority Data

Mar. 27, 2002  (GB) ................... 0207284.1

(51) Int. Cl.
*B01D 53/14* (2006.01)
(52) U.S. Cl. .............. 423/240 R; 95/199; 95/219; 95/223; 95/233
(58) Field of Classification Search ........... 55/447–448, 55/451; 95/230, 233, 233.199, 219, 223; 96/243, 251, 301, 306, 313, 355, 359–360; 423/240 R, 241
See application file for complete search history.

(56) References Cited

U.S. PATENT DOCUMENTS

| 4,003,723 | A | * | 1/1977 | Schafer et al. ............. 95/199 |
| 4,106,918 | A | * | 8/1978 | Fujikawa et al. ............ 95/199 |
| 4,318,717 | A | * | 3/1982 | Sohier ..................... 95/199 |
| 4,381,190 | A | * | 4/1983 | Carron et al. .............. 95/199 |
| 4,583,999 | A | * | 4/1986 | Lindahl et al. ............. 95/199 |
| 5,756,058 | A | * | 5/1998 | Watanabe et al. .......... 423/238 |
| 6,126,906 | A |   | 10/2000 | Imamura |
| 6,284,022 | B1 | * | 9/2001 | Sachweh et al. ............ 95/149 |

FOREIGN PATENT DOCUMENTS

| EP | 1 023 932 A1 | 8/2000 |
| EP | 1 129 763 A1 | 9/2001 |
| EP | 1 180 497 A1 | 2/2002 |
| GB | EP-1023932 A1 * | 2/2000 |
| GB | EP-1023932 A1 * | 8/2000 |

OTHER PUBLICATIONS

International Search Report for International Publication No. PCT/GB03/01356; Date of mailing of the international search report: Jul. 25, 2003.

\* cited by examiner

*Primary Examiner*—Duane Smith
*Assistant Examiner*—Ives Wu

(57) ABSTRACT

A method for scrubbing a halogen-containing gas, comprises contacting the halogen-containing gas with water at a temperature of at least 30° C., the gas optionally subsequently being subjected to a further treatment step comprising contacting it with water at a temperature of less than 30° C. and/or a gas dilution step. An apparatus for carrying out the method comprises a hot wash chamber (6) and optionally a cold wash chamber (7) and/or a gas dilution device (13).

16 Claims, 2 Drawing Sheets

EXHAUST GAS TREATMENT

National Stage application of International Application No. PCT/GB03/01356 filed Mar. 27, 2003, which claims priority to British Application No. GB 0207284.1 filed Mar. 27, 2002.

This invention relates to the treatment (scrubbing) of exhaust gases and, more particularly, to the treatment of halogen or halogen-containing exhaust gases, for example, in the semiconductor industry.

The removal of halogens from exhaust gases is widely practised. The utilisation of, or generation of, fluorine in certain semiconductor processes has become increasingly common in recent years. However, fluorine is a very toxic substance, being an aggressive oxidising agent and having a threshold limiting value (TLV) of 1 ppm.

Attempts to scrub fluorine with ambient temperature water—primarily to form hydrogen fluoride (HF)—have generally not been successful in that fluorine reaction rates with water are relatively slow and usually result in a high emission rate from the wet scrubber.

Attempts have been made to improve the efficiency of the wet scrubbing process, for example the dosing of the scrubber with sodium hydroxide (NaOH) or potassium hydroxide (KOH) but, although this produced a greater fluorine abatement, resulted in a very high conversion of the fluorine to oxygen difluoride ($OF_2$) which is a very toxic by-product.

As a further example, ammonia—both in gaseous form and as ammonium hydroxide—has been used as additive to the water scrubber. However, whilst a reduction in the fluorine content was found, the formation of ammonium fluoride occurs which is emitted in the form of a fine fume from the scrubber.

In the semi conductor industry, fluorine containing species are used to clean the wafer making production chamber after a film deposition step. Gases like $SiH_4$ (silane) and ammonia ($NH_3$) may be used to deposit a film of silicon nitride on to the wafer. The cleaning step ($NF_3$, $F_2$ etc.) is used after several cycles of deposition have taken place.

The downstream equipment, including vacuum pump and a gas abatement system, needs to be capable of handling both deposition and clean gases in turn.

There is a need for an improved method/apparatus in which halogens, and especially fluorine, can be treated more efficiently and effectively so as to meet the increasingly stringent regulations regarding its disposal.

The term "halogen" is used herein to include both molecular halogen and halogen compounds, including halides. Similarly, the term "fluorine" is used herein to include both molecular fluorine and fluorine compounds, including fluorides.

In accordance with the invention, there is provided a method of scrubbing a halogen-containing gas stream comprising contacting the gas stream with water at a temperature of at least 30° C. The water temperature may advantageously be at least 35° C. Preferably, the temperature of the water is not more than 100° C., more preferably from 35° C. to 80° C., for example 40 to 80° C.

The invention has particular application to the scrubbing of molecular fluorine ($F_2$).

Increasing the temperature of the water in an $F_2$ scrubber might have been expected to result in an increase in the vapour pressure of the $F_2$ in the gas ($F_2$ (gas)), with the consequence that the rate of dissolution of $F_2$ in the water (to give an $F_2$ concentration of $F_2$ (aq.)) would reduce. More particularly, it might have been thought, based on the reduction in scrubbing efficiency observed at elevated temperatures in the scrubbing of acid species such as HF or basic species such as $NH_3$ with pure water, that the rate limiting stip was dissolution of the fluorine, $F_2$ (gas), in water:

$$F_2 \text{ (gas)} \rightarrow F_2 \text{ (aq.)}$$

The inventors have found that, surprisingly, the effectiveness of removal of the $F_2$ from the gas is improved when warm water is used. It is believed that may be because at the temperatures of above 30° C. used in accordance with the invention, reaction of the $F_2$ with water according to the equation:

$$F_2 + H_2O \rightarrow 2HF + \tfrac{1}{2}O_2$$

occurs readily. In consequence, $F_2$ (aq.) is maintained relatively low, favouring a relatively high rate of uptake of $F_2$ (gas) by the water. The competing reaction of $F_2$ to form oxygen diflouride is favoured at low temperatures over the conversion to HF, but it has been found by the inventors that at elevated temperatures of 30° C. and above the reaction to give HF predominates.

Heating of the water can be effected by traditional methods including immersion heaters within a hot sump in the scrubbing apparatus or on-line heaters in to the pumped flows. Whilst the method of the invention can be used for scrubbing any halogen gas, it may offer particular advantages in the scrubbing of fluorine-containing exhaust gases.

The water may be in the form of water vapour (or steam) with the halogen and steam being admixed in the process. The water may, if desired, include added ingredients to enhance the removal of halogen and other substances from the gas stream In a preferred embodiment, the process of the invention can include a hot stage and a cold stage. In the hot stage, the halogen gas will preferentially react with the hot water but the gas flow will tend to become saturated with water. In the subsequent second stage, there can be an effective removal of gases such as ammonia and, in reducing the gas temperature, that stage will cause a reduction in the entrained water vapour.

It is generally known that, where silane is present in the exhaust gas, the provision of an air dilution stage is useful to prevent fire/explosion which is normally added to the inlet of a wet scrubber. However, this practice can be shown to reduce the capacity of the wet scrubber because it increases the volumetric flow rate and reduces the contact time in the scrubber of the gas(es) to be treated.

Silane ($SiH_4$) is a pyrophoric gas. Experience shows that if silane is present at >2% in a gas stream it has the potential, on contact with air, to react to form:

$$SiH_4 + 2O_2 \rightarrow SiO2 + 2H_2O + \text{heat}$$

(air)

By causing the air to mix with the silane-containing gas stream in a cyclone the larger particles formed by the reaction may be removed from the gas stream.

Should the air addition to the silane-containing gas stream dilute the silane below its pyrophoric limit then the gas will not further spontaneously react in a violent manner.

It has been found with the process of the invention, in particular, that treating the silane by addition of air after the wet scrubbing stage allows for a lower mass flow and higher contact time for the halogen. A much higher mass of added air can therefore be included in the silane flow to ensure the safe oxidation of the silane and minimisation of the temperature rise resulting from the oxidation. Thus, the method of the invention may comprises at least one further treatment step, following the step of contacting with water at a temperature of at least 30° C. The at least one further treatment step advantageously comprises a step of contacting the gas stream with water at a temperature of less than 30° C., advantageously not more than 25° C., and preferably not more than 20° C., and/or a step of diluting the gas stream with a diluent gas, preferably air. Where present, the dilution step may advantageously be carried out in a cyclone device. One suitable form of cyclone device is described in our European Patent Specification No. 1023932A.

The invention also provides an apparatus for scrubbing a halogen from a gas stream, comprising a hot wash scrubbing chamber in which the gas stream can be contacted with a hot wash flow of water, a water supply device for supplying to said hot wash scrubbing chamber water at a temperature of at least 30° C., a source of a halogen-containing gas for supplying to said hot wash scrubbing chamber a gas stream containing the halogen and an outlet from said hot wash chamber for treated gas. The apparatus advantageously further comprises a cold wash scrubbing chamber downstream of said hot wash scrubbing chamber, a cold water supply device for supplying to said cold wash chamber water at a temperature of less than 30° C., a communication pathway for transport of the treated gas from the outlet of the hot wash chamber into the cold wash chamber, and an outlet for treated gas from said cold wash chamber. In one advantageous embodiment of the invention, the cold wash scrubbing chamber is arranged above the hot wash scrubbing chamber.

For a better understanding of the invention, reference will now be made, by way of exemplification only, to the accompanying drawings, in which:

FIG. 2b is a side view of the arrangement of FIG. 2a.

Figure 1:
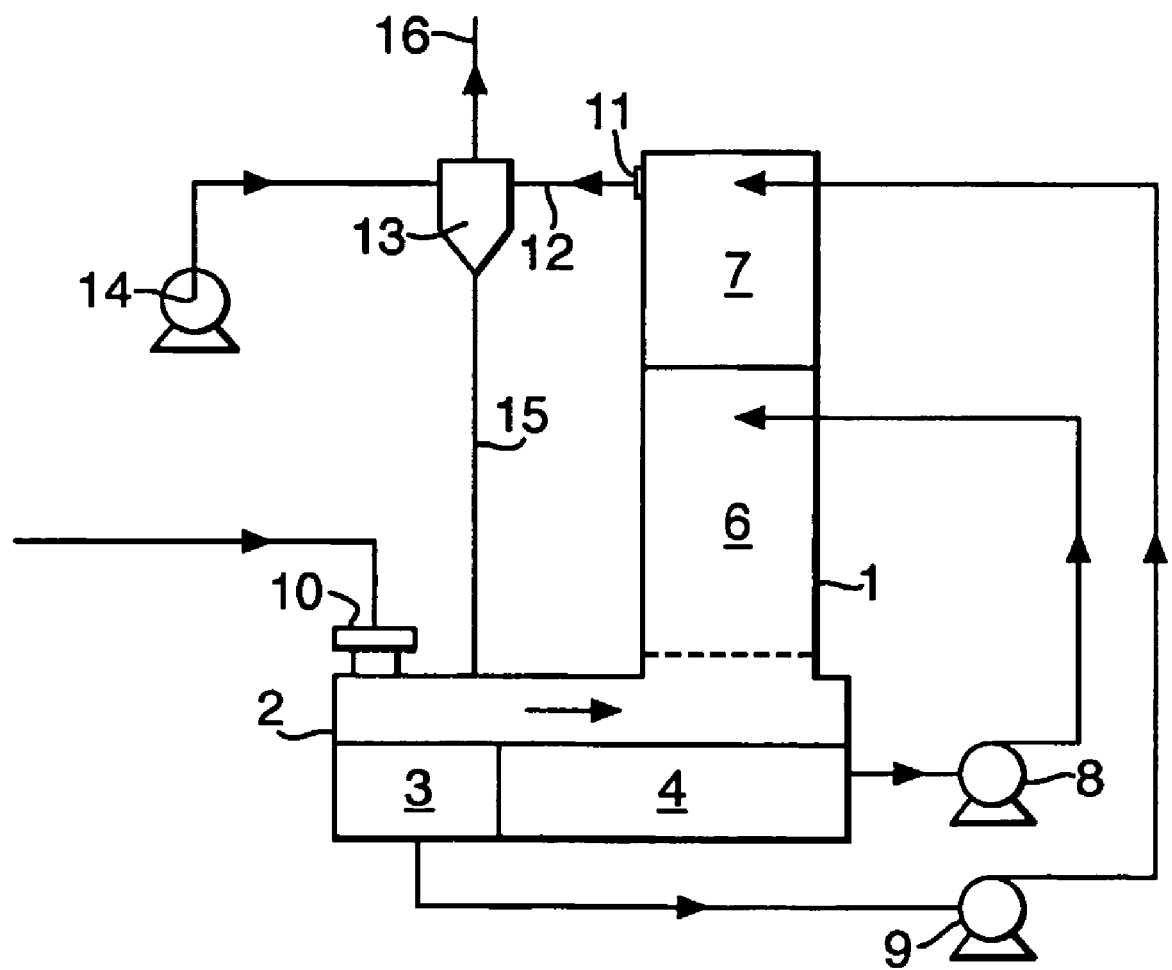
FIG. 1 shows in schematic form an apparatus for carrying out one form of process of the invention.

With reference to the drawing, apparatus of the invention comprises a body 1 having in the base thereof a water tank 2 divided in to two parts 3, 4 by means of a separator 5.

The part 3 acts as a water sump and is adapted to hold cold water, for example at 15° C., and the part 4 also acts as a water sump and is adapted to hold hot water, for example at 35° C. to 70° C. Part 4 comprises an outlet (not shown) for periodic withdrawal of water from the system. Part 2 comprises an inlet (not shown) for periodic introduction of fresh water. The tank 2 possesses electrical heater and control means (not shown) to maintain the water at these temperatures. Although not shown in the drawings, an insulating wall, which may be in the form of a double wall enclosing an insulating air pocket, may be present between parts 3 and 4.

Situated above the tank 2 within the body 1 is a two part packed tower having a lower part 6 and an upper part 7. The lower part 6 has a perforate bottom wall 6a, through which water drains back into tank 2. Upper part 7 is separated from tower part 6 by a separation arrangement described below with reference to FIG. 2. The lower part 6 and upper part 7 are filled with packings which provide distribution channels in each part for the flow of water therethrough (and in good contact therewith) independent of the other part including channels to allow the water to be returned to the tank 2. The packings are of a material having good chemical and thermal resistance, for example, polypropylene. A proprietary packing of polypropylene giving a void volume of approximately 80 to 90% of the total volume in each of tower parts 6 and 7 has been found to be particularly suitable in practice, although higher and lower void volumes may also be used. By way of illustration, the total volume of the parts 6 and 7 may be about 0.1 m³ distributed in a ratio of 3:1 between the lower part 6 and upper part 7, although in practice a wide variety of different volumes and distributions may be used.

Two pumps 8 and 9 are provided to pump water from the cold water tank part 3 and from the hot water tank part 4 respectively in to the distribution channels of the upper packed tower upper part 7 and distribution channels of the packed tower lower part 6 respectively.

An inlet 10 is provided in the body 1 for the entry of an exhaust gas stream in to the body 1. The inlet 10 is adapted by means not shown to provide a combined aqueous liquor and nitrogen gas "curtain" in water to prevent any particulate blockage and/or liquor back-streaming towards the chamber in which the semiconductor processing is occurring.

An outlet 11 is also provided in the body 1 for the exiting of gas stream from the body 1.

A pipe 12 links the outlet 11 with a cyclone 13 in to which the gas stream flows. Any pyrophoric gas in the stream, for example silane, will be oxidised or heavily diluted with air provided by an air blower 14 depending on the silane concentration in the gas stream. Any particulates formed during oxidation (silicon oxides in the case of silane) can be collected at the base of the cyclone 13 (and if appropriate drained in to the tank 2 via the tube 15) with the treated exhaust gases exiting from the cyclone 13 via the tube 16. Where particulates are drained into the tank 2, those may in part be recirculated with the water to tower parts 6 and/or 7. For that reason, the pumps 8 and 9 are preferably mechanical agitative pumps where the particulates are returned to tank 2. As a result, any large particles or agglomerates will be broken up by the pumps and the resulting small particles can flow in suspension through the tower with little or no deposition occurring.

Figure 2A:
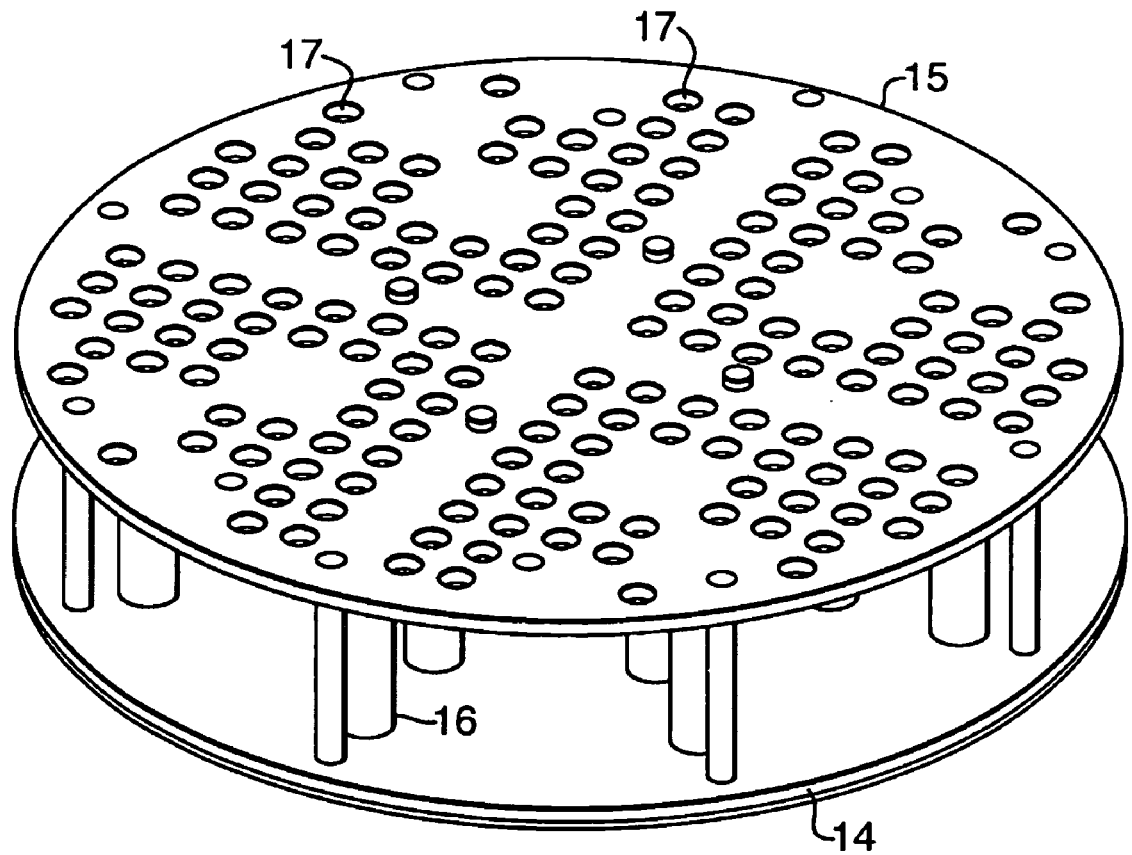
FIG. 2a is perspective view from above of a gas transfer arrangement for use in the apparatus of FIG. 1.
Figure 2B:
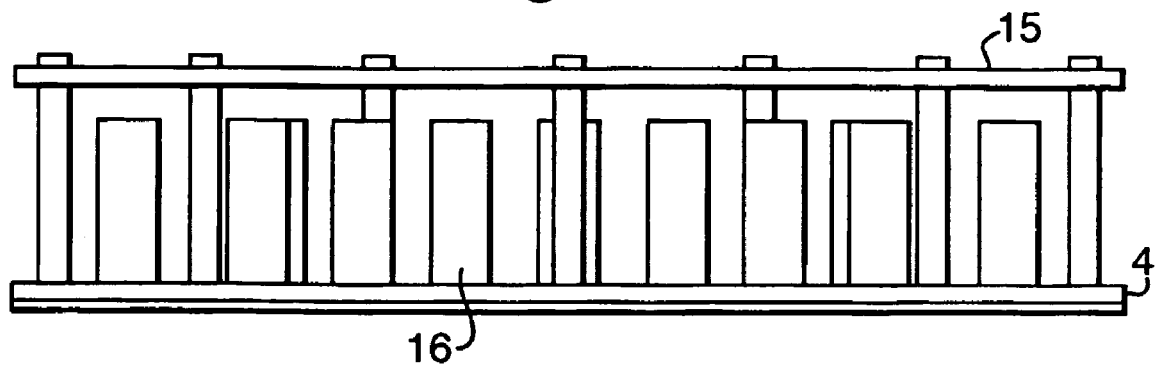

Referring to FIG. 2, a separation arrangement for dividing tower parts 6 and 7 is shown. The separating arrangement comprises two vertically spaced, coaxially arranged plates, comprising lower plate 14 and upper plate 15. Lower plate 14 forms, in use, the top wall of tower lower part 6 and the bottom wall of tower upper part 7 and has a multiplicity of risers 16 which provide communication passageways for the gas from the lower side of plate 15, that is, from tower part 6, into the tower part 7. Upper plate 15 is supported in the tower by support means (not shown) such that it is spaced from the lower plate 14 by a distance greater than the height of the risers 16, providing for a clearance between the upper extremity of each riser and the bottom surface of plate 15. Upper plate is perforated by circular apertures 17, the location of the perforations being such that they are not in register with the risers 16. The diameter of apertures 17 is preferably lower than the internal diameter of risers 16. For example, the apertures 17 may have a diameter of about 16 mm and the risers 16 an internal diameter of about 25 mm. A drainage outlet (not shown) is provided for removal of water collecting on the top surface of the plate 14. That water, the temperature of which will typically have been increased slightly during passage through upper part 7, is returned via a conduit (not shown) to tank 4. The separation arrangement permits the gas stream to pass upwards from part 6 into part 7 whilst water penetration from upper part 7 into part 6 and entry of the packing into the risers 16 (which could hinder passage of the gas) is substantially prevented.

In use of the apparatus shown in the drawings, an exhaust gas stream is pumped from the semiconductor processing chamber (not shown) by means of one or more vacuum pumps (not shown) in to the inlet 10 and thence in to the tower lower part 6 of the packed tower where it contacts the hot water pumped through the distribution channels formed in the packings thereof by means of the pump 8. The water flowing through tower lower part 6 returns to the tank 2 via the perforations in the bottom wall of tower part 6.

The distribution channels in the tower are such that the exhaust gas steam can then enter the distribution channels of the upper part 7 of the tower when it contacts the cold water pumped therethrough by means of the pump 9.

The main purpose of the tower lower part 6 of the packed tower is for the removal of fluorine by contact with the hot water and of any particulates entrained in the stream. The remaining gases in the stream then pass in to the upper part 7 of the packed tower where residual gases including ammonia are scrubbed by contact with the cold water.

The resulting gases then pass to the cyclone 13 for treatment as described above. Periodically, a proportion of the water is drained from the system and replaced. That is done by draining approximately 25% of the water from tank 4, transferring a corresponding amount of water from tank 3 to tank 4, and introducing fresh water into tank 3 to replace the removed water.

The invention claimed is:

1. A method of scrubbing a halogen-containing gas stream, comprising:
   contacting the gas stream with water at a temperature of at least 40° C. for facilitating chemical reaction between the gas stream and the water at a temperature of at least 40° C.; and
   a further treatment step comprising contacting the gas stream with water at a temperature of less than 30° C. for dissolving the gas steam in the water of less than 30° C.

2. A method according to claim 1, in which the water is in the liquid phase.

3. A method according to claim 1, in which the gas stream is contacted with water vapor.

4. A method according to claim 1, in which the gas stream is contacted with water at a temperature of from 35° C. to 80° C.

5. A method according to claim 1, comprising diluting the gas stream with a diluent gas.

6. A method according to claim 5 in which the gas stream is contacted with the diluent gas in a cyclone device.

7. A method of claim 1, comprising subsequently treating the gas stream in a cyclone device in which it is diluted with a diluent gas stream and withdrawing separately from the cyclone device solid particulate material and a treated gas stream.

8. A method according to claim 7, in which the diluent gas is air.

9. A method according to claim 7, in which the halogen-containing gas stream is an exhaust gas from semiconductor manufacture.

10. A method according to claim 7, in which in the water-contacting step the gas stream is arranged to be in generally counterflow relationship with the water.

11. A method according to claim 10, in which in the water-contacting step the gas stream is caused to flow in a generally upward direction and the water is caused to flow in a generally downward direction.

12. A method according to claim 7, in which the halogen-containing gas stream is a fluorine-containing gas stream.

13. A method according to claim 5 in which the diluent gas is air.

14. A method according to claim 1, in which the halogen-containing gas stream is an exhaust gas from semiconductor manufacture.

15. A method according to claim 1, in which in the water-contacting step the gas stream is arranged to be in generally counterflow relationship with the water.

16. A method according to claim 1, in which the halogen-containing gas stream is a fluorine-containing gas stream.

* * * * *